(12) United States Patent
Koishi (10) Patent No.: US 7,542,669 B2
(45) Date of Patent: Jun. 2, 2009

(54) DIFFRACTION DISPLAY DEVICE AND VIEWFINDER DISPLAY DEVICE

(75) Inventor: Hiroyuki Koishi, Yokohama (JP)

(73) Assignee: Nikon Corporation, Tokyo (JP)

( * ) Notice: Subject to any disclaimer, the term of this patent is extended or adjusted under 35 U.S.C. 154(b) by 329 days.

(21) Appl. No.: 11/436,611

(22) Filed: May 19, 2006

(65) Prior Publication Data

US 2006/0263079 A1 Nov. 23, 2006

(30) Foreign Application Priority Data

May 23, 2005 (JP) ............................. 2005-150027

(51) Int. Cl.
*G03B 17/20* (2006.01)
*G02F 1/1335* (2006.01)
*G02F 1/13* (2006.01)
*G03H 1/22* (2006.01)

(52) U.S. Cl. ..................... 396/296; 396/288; 349/96; 349/201; 359/32

(58) Field of Classification Search ............... 396/281, 396/288, 296, 373–374, 384; 349/61–62, 349/67, 84, 86, 88–91, 96, 149, 151–154, 349/201; 348/333.01–333.02, 333.08–333.09, 348/335, 341; 359/32
See application file for complete search history.

(56) References Cited

U.S. PATENT DOCUMENTS

| 6,847,428 B1 | 1/2005 | Sekiguchi et al. |
| 2004/0165126 A1* | 8/2004 | Ooi et al. ...................... 349/96 |
| 2006/0034603 A1 | 2/2006 | Homma |

FOREIGN PATENT DOCUMENTS

| EP | 1 213 601 A1 | 6/2002 |
| JP | A 9-152553 | 6/1997 |
| JP | A 2002-221621 | 8/2002 |
| JP | A 2004-191415 | 7/2004 |
| WO | WO 2004/053575 A1 | 6/2004 |

OTHER PUBLICATIONS

Date et al., "Diffraction-controlling display with edge lighting using alignment-controlled holographic polymer dispersed liquid Crystal (AC-HPDLC)," Asia Display / IDW, pp. 297-300, XP009071069, 2001.

* cited by examiner

*Primary Examiner*—Bot LeDynh
(74) *Attorney, Agent, or Firm*—Oliff & Berridge, PLC

(57) ABSTRACT

A diffraction display device includes a diffraction optical element that comprises a diffraction display portion and a non-display portion disposed between a pair of substrates, and an illuminating device that emits linearly polarized illuminating light to be incident on a side surface of the diffraction optical element. In the diffraction display device, the illuminating light having entered the diffraction optical element exits the diffraction optical element through a substrate surface at which the diffraction display portion is disposed.

13 Claims, 6 Drawing Sheets

DIFFRACTION DISPLAY DEVICE AND VIEWFINDER DISPLAY DEVICE

INCORPORATION BY REFERENCE

The disclosure of the following priority application is herein incorporated by reference: Japanese Patent Application No. 2005-150027 filed May 23, 2005

BACKGROUND OF THE INVENTION

1. Field of the Invention

The present invention relates to a diffraction display device, a viewfinder display device and a camera.

2. Description of Related Art

Japanese Laid Open Patent Publication No. 2004-191415 discloses a technology that utilizes a liquid crystal hologram constituted with a refractive index diffraction optical element as a viewfinder display element of a camera. A liquid crystal hologram is achieved in the related art by forming a refractive index diffraction grating assuming a cyclically layered structure that includes refractive-index isotropic areas and refractive-index anisotropic areas within a liquid crystal plate constituted with a polymer-dispersed liquid crystal. As illuminating light enters through a side surface of the liquid crystal plate, the light becomes diffracted at the refractive index diffraction grating and exits the liquid crystal plate toward a pentaprism. The diffracted light is then used to observe characters, graphics or the like as a viewfinder display.

However, in the non-display portions around the display portion where the refractive index diffraction grating is formed so as to display characters or graphics, the material used to constitute the refractive-index isotropic areas and the material used to form the refractive-index anisotropic areas are present together in an unhardened mixed state. For this reason, the illuminating light having entered over this area becomes scattered, which then lowers the display contrast of the characters or the graphics on display, greatly compromising the functions of the optical display device.

SUMMARY OF THE INVENTION

A diffraction display device according to a first aspect of the present invention includes a diffraction optical element that includes a diffraction display portion and a non-display portion disposed between a pair of substrates; and an illuminating device that emits linearly polarized illuminating light to be incident on a side surface of the diffraction optical element, wherein the illuminating light having entered the diffraction optical element exits the diffraction optical element through a substrate surface at which the diffraction display portion is disposed.

It is preferable that the illuminating device includes a light source and a polarization conversion element that converts the light emitted from the light source to light that is linearly polarized in a direction perpendicular to the substrates. The polarization conversion element may be a selective polarization hologram element. A radiation angle altering device may be further provided, that is disposed between the light source and the polarization conversion element and alters a radiation angle of the illuminating light measured along a surface of the substrates.

The radiation angle altering device may alter the radiation angle so as to ensure that the illuminating light having entered the diffraction optical element undergoes total reflection at a side surface of the diffraction optical element that is substantially perpendicular to the side surface to which the illuminating light enters. The light source may be a LED.

It is preferable that the diffraction display portion includes refractive-index isotropic areas constituted with a refractive-index isotropic material and refractive-index anisotropic areas containing a refractive-index anisotropic liquid crystal disposed alternatively to each other in a direction extending along surfaces of the substrates; and the non-display portion is disposed around the diffraction display portion, and is constituted with a mixed material containing both the liquid crystal and the refractive-index isotropic material. In the diffraction display portion, the refractive-index isotropic areas may be constituted of a monomer that has hardened and become a polymer, and the liquid crystal may be dispersed in a hardened polymer in the refractive-index anisotropic areas.

A viewfinder display device according to a second aspect of the present invention includes a diffraction display device according to the first aspect of the present invention, wherein the diffraction optical element is disposed in a vicinity of a focusing screen and viewfinder display is formed with the illuminating light diffracted at the diffraction display portion.

A camera according to a third-aspect of the present invention includes a viewfinder display device according to the second aspect of the present invention, wherein the viewfinder display device superimposes a predefined information over a photographed subject image.

In a display method by using a diffraction optical element that comprises a diffraction display portion and a non-display portion disposed between a pair of substrates, according to a fourth aspect of the present invention, linearly polarized illuminating light is emitted to be incident on a side surface of the diffraction optical element, and the illuminating light having entered the diffraction optical element is diffracted so as the illuminating light to exit through a substrate surface at which the diffraction display portion is disposed.

DESCRIPTION OF PREFERRED EMBODIMENTS

Figure 1:
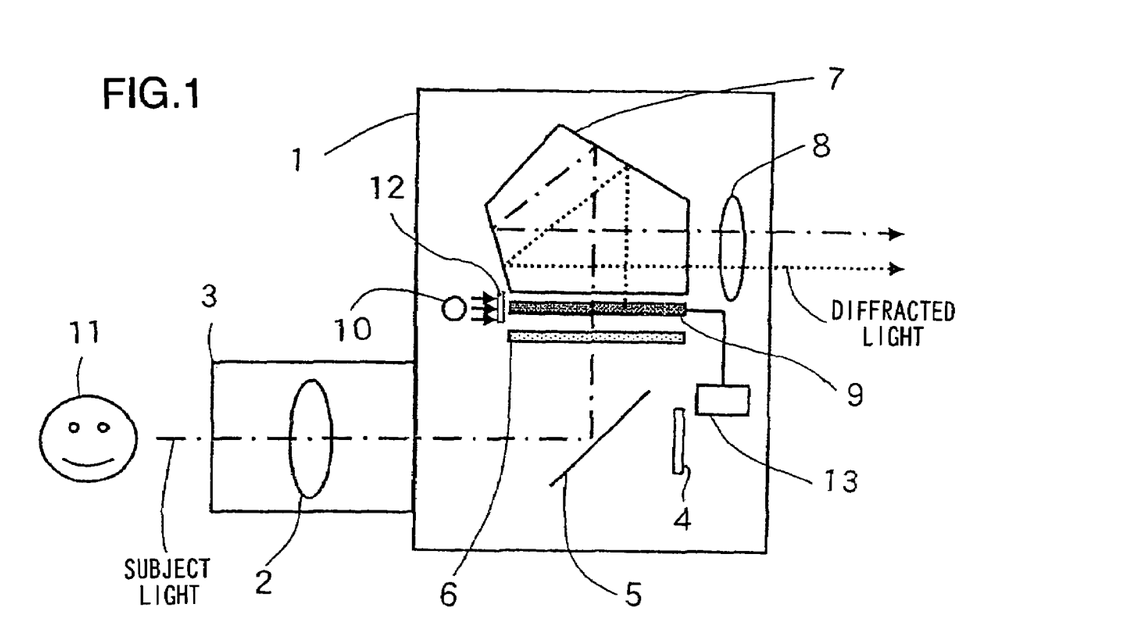
FIG. 1 schematically shows a structure of a single lens reflex camera equipped with a viewfinder display device according to an embodiment of the present invention.

The following is an explanation of an embodiment of the present invention, given in reference to the drawings. FIG. 1 schematically shows the structure of a single lens reflex camera equipped with a viewfinder display device achieved in the embodiment of the present invention. An interchangeable lens barrel 3, which includes a photographic lens 2, is mounted at a camera body 1. Reference numeral 4 indicates a film constituting a recording medium. While FIG. 1 shows a single lens reflex camera in which silver halide film is used, an imaging element such as a CCD or a CMOS should be used as the recording medium in a single lens reflex digital camera.

A quick-return mirror 5 that reflects subject light toward a viewfinder optical system is disposed between the photographic lens 2 and the film 4. It is to be noted that although not shown, a shutter is disposed between the film 4 and the quick-return mirror 5. A focusing screen 6 is disposed at a position that is optically conjugate with the position of the surface of the film 4 coated with a photosensitive material, and an image is formed on the focusing screen 6 with the subject light from a subject 11 reflected at the quick-return mirror 5. The subject image formed on the focusing screen 6 can be observed via a pentaprism 7 and an eyepiece lens 8. It is to be noted that the quick-return mirror 5 is made to assume a position outside the optical path of the subject light during a photographing operation so as to allow the subject image to be formed on the film 4.

In addition, a viewfinder display element 9 is disposed inside the camera body 1 at a position adjacent to the focusing screen 6. A light source 10 that emits light used to illuminate the viewfinder display element 9 is disposed at a side of the viewfinder display element 9. The light source 10 may be constituted with an LED or the like. The light source 10 emits unpolarized light which includes naturally polarized light or partially polarized light. Between the light source 10 and the viewfinder display element 9, a polarizing plate 12 constituting a polarization conversion element that converts the light from the light source 10 to linearly polarized light is disposed.

The light emitted from the light source 10 is converted to linearly polarized light at the polarizing plate 12 and enters the viewfinder display element 9 through a side surface thereof. As detailed later, the viewfinder display element 9 is a diffraction optical element that includes a display portion constituted with a refractive index diffraction grating, and the light having entered the viewfinder display element 9 is diffracted at the refractive index diffraction grating toward the pentaprism 7. The viewfinder display element 9 is driven by a drive circuit 13, and specific information, e.g., a focal point detection area, exposure time, f-number, and the like, is displayed inside the viewfinder field via the display portion constituted with the refractive index diffraction grating.

The diffracted light having exited the viewfinder display element 9 is reflected at the pentaprism 7 and is observed by an user as the specific information via the eyepiece lens 8. The specific information displayed or superimposed within the viewfinder field over the subject image mentioned earlier can be observed by the user together with the subject image.

(Viewfinder Display Element 9)

Figure 2:
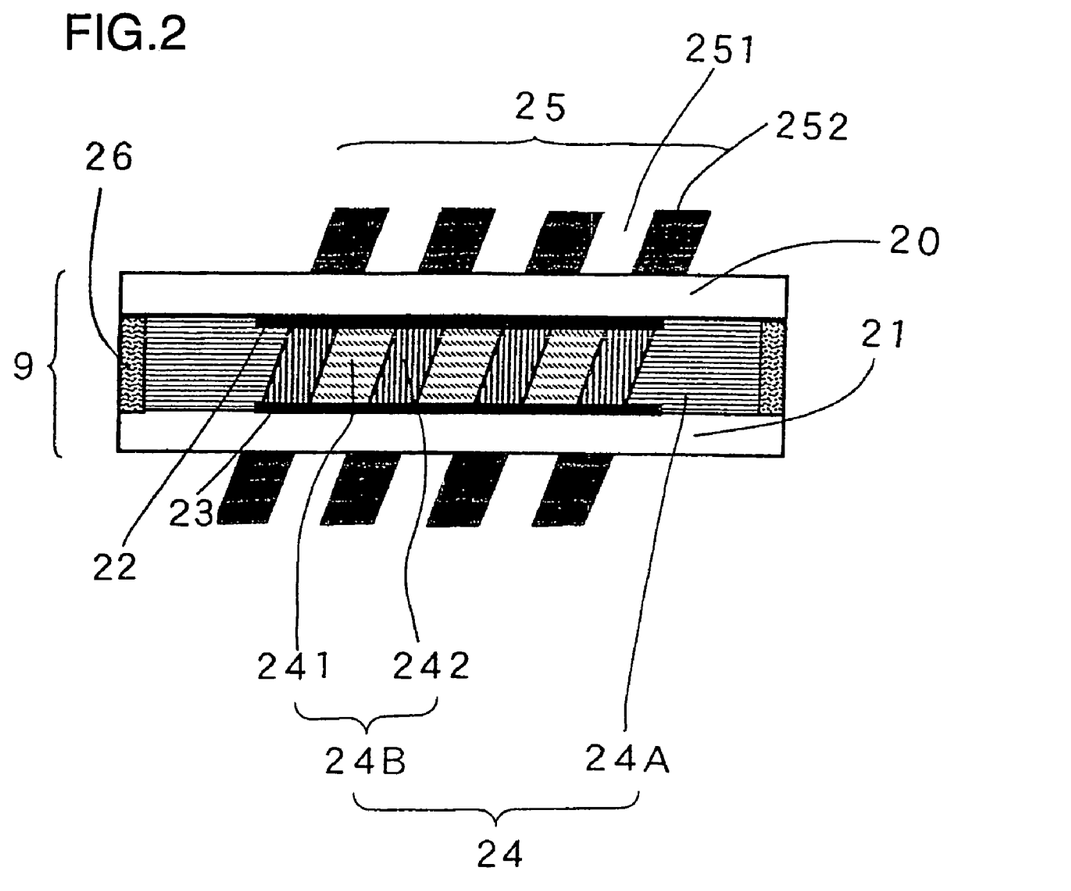
FIG. 2 is a schematic diagram of a viewfinder display element, illustrating a display portion and a non-display portion at the viewfinder display element.

Next, the viewfinder display element 9 is explained in detail. FIG. 2 illustrates the display portion and the non-display portion of the viewfinder display element 9 in a schematic sectional view of the viewfinder display element 9. The viewfinder display element 9 includes a pair of glass substrate 20 and 21, with transparent electrodes 22 and 23 respectively formed at the glass substrates 20 and 21 at their surfaces facing opposite each other. The transparent electrodes 22 and 23 are formed in shapes identical to each other, in correspondence to the display mode (characters or graphics) of the display portion. The transparent electrodes 22 and 23 are connected to the drive circuit 13 mentioned earlier and the voltage application to the transparent electrodes 22 and 23 is controlled by the drive circuit 13.

A liquid crystal member 24 is disposed between the glass substrates 20 and 21 that respectively include the transparent electrodes 22 and 23, and the liquid crystal member 24 is sealed with a seal material 26 disposed over the peripheral areas between the glass substrates 20 and 21. The liquid crystal member 24 is constituted with a polymer-dispersed liquid crystal. A non-display portion 24A where the transparent electrodes 22 and 23 are not present is constituted with a material with refractive-index isotropic characteristics (a monomer) and a material with refractive-index anisotropic characteristics (liquid crystal) in an unhardened, mixed state.

A display portion 24B sandwiched between the transparent electrodes 22 and 23 forms a liquid crystal hologram adopting a portiond, multilayer structure that includes refractive-index isotropic area layers 241 and refractive-index anisotropic area layers 242 alternating with each other in the illuminating light advancing direction along the plane of the viewfinder display element 9. The refractive-index isotropic area layers 241 are constituted of the monomer mentioned earlier that has hardened and become a polymer whereas the refractive-index anisotropic material, i.e., the liquid crystal, is dispersed in the hardened polymer in the refractive-index anisotropic area layers 242.

The multilayer structure in FIG. 2 is achieved by forming interference fringes 25 with laser light or the like and then disposing a liquid crystal substrate constituted of a monomer and a liquid crystal in a mixed state over the area where the interference fringes 25 are formed. At this time, masks are formed at the glass substrates 20 and 21 so as to ensure that the interference fringes 25 are not formed over the non-display portion 24A. As the monomer undergoes the process of photopolymerization and becomes hardened, polymer layers each constituted of the hardened monomer are formed over light portions 251 in the interference fringes where the light intensity is high due to the interference. The speed of the photopolymerization over dark portions 252 in the interference fringes where the light intensity is not as high is lower than the photopolymerization speed at the light portions 251 in the interference fringes, and thus, the monomer is drawn toward the areas with higher light intensity (the areas where the photopolymerization speed is higher), raising the liquid crystal density over the dark portions 252. As a result, the layered structure that includes the refractive-index isotropic area layers 241 constituted with the polymer and the refractive-index anisotropic area layers 242 constituted with the polymer with the high liquid crystal density is formed in a pattern identical to the pattern of the interference fringes 25.

As described earlier, a voltage can be applied via the drive circuit 13 (see FIG. 1) to the transparent electrodes 22 and 23 disposed so as to enclose the display portion 24B. An isotropic refractive index is retained at the refractive-index isotropic area layers 241 constituted with the polymer, regardless of whether or not the voltage is applied. However, the orientation of the liquid crystal changes depending upon whether or not the voltage is applied at the refractive-index anisotropic area layers 242 where the liquid crystal is dispersed in the polymer, and as the liquid crystal orientation changes, the refractive index at the refractive-index anisotropic area layers 242, too, changes.

The refractive index at the liquid crystal and the refractive index at the polymer assume values different from each other so as to satisfy the Bragg diffraction condition with regard to light entering the display element 9 toward the layering direction at the display portion 24B, e.g., the illuminating light from the light source 10, when the voltage is not applied to the transparent electrodes 22 and 23. Namely, when no voltage is applied, a refractive index diffraction grating with layers with a high refractive index and layers with a low refractive index alternating each other is formed at the display portion 24B.

The diffraction conditions are set so that the diffracted light is diffracted toward the pentaprism 7 under these circumstances. As the voltage is applied, the orientation of the liquid crystal in the refractive-index anisotropic area layers 242 changes and the refractive-index in the refractive-index anisotropic area layers 242, too, changes, so that the refractive index at the liquid crystal becomes equal to the refractive index at the polymer. Under these conditions, the light having entered the display element 9 is transmitted through the display portion 24B without becoming diffracted.

Figure 3A:
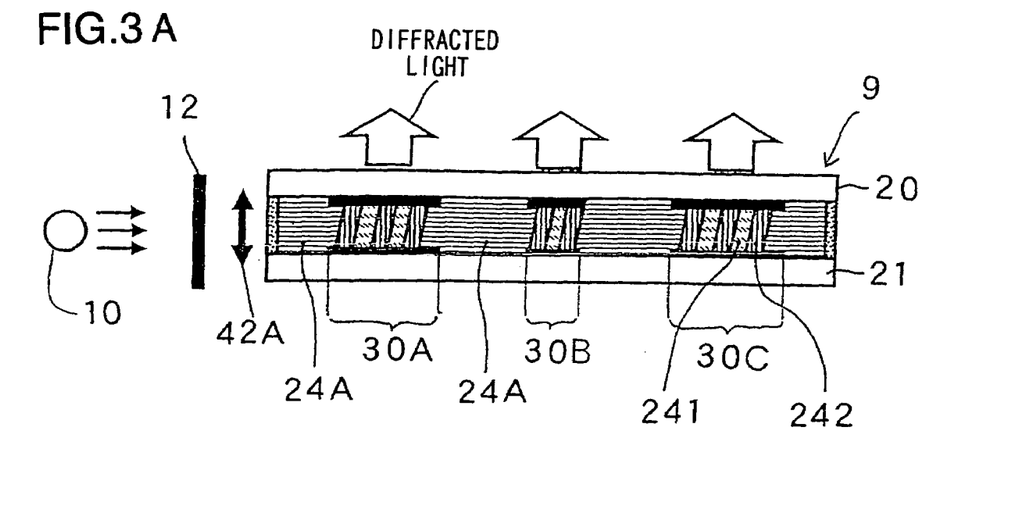
FIGS. 3A and 3B illustrate the voltage application OFF state and the voltage application ON state of the viewfinder display element.
Figure 3B:
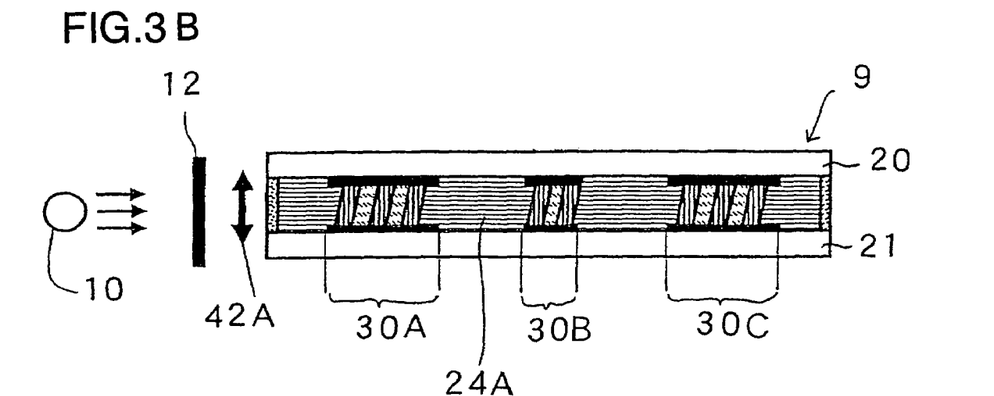

FIGS. 3A and 3B show the relationship between the ON/OFF state of the voltage applied to the transparent electrodes at the viewfinder display element 9 and the display ON/OFF state. FIG. 3A shows the voltage application OFF state and FIG. 3B shows the voltage application ON state. It is to be noted that FIGS. 3A and 3B show three display portions 30A, 30B and 30C formed at the viewfinder display element 9, with the individual display portions 30A through 30C each assuming a layered structure that includes refractive-index isotropic area layers and refractive-index anisotropic area layers, as does the display portion 24B explained earlier.

Figure 6:
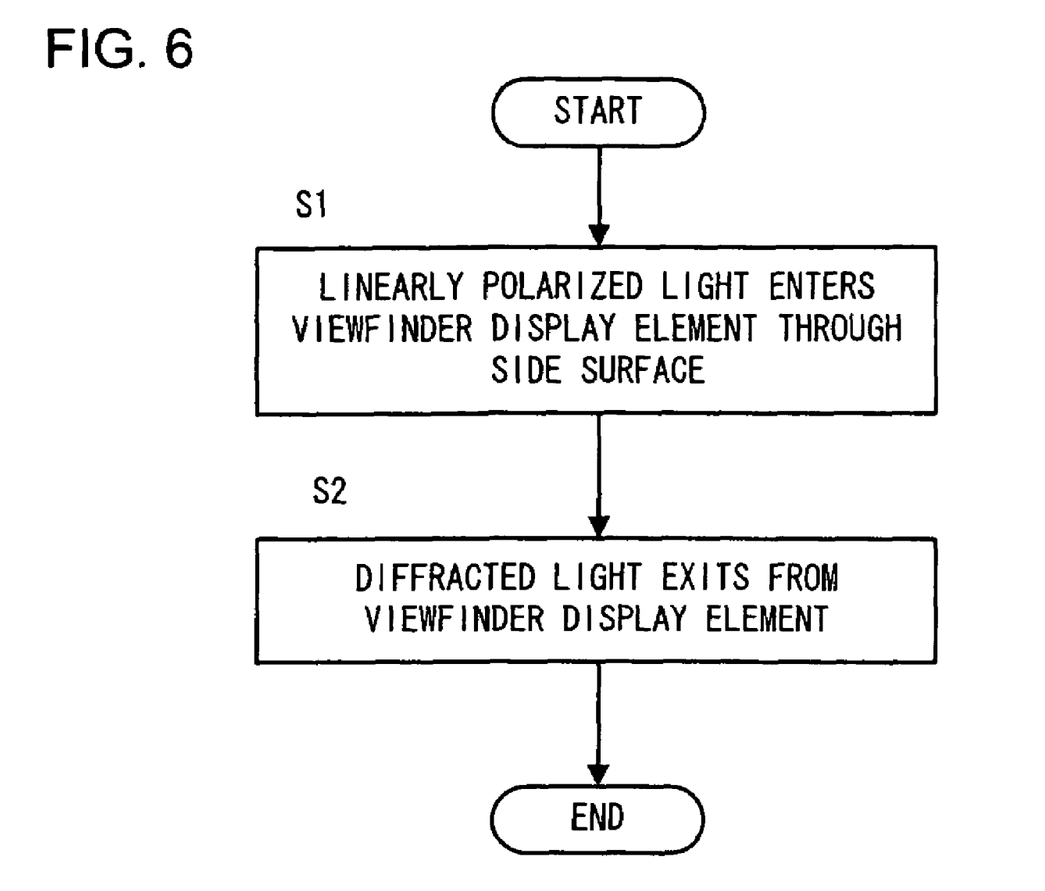
FIG. 6 presents a flowchart illustrating a display method using the refractive index diffraction grating.

As the voltage application to the transparent electrodes sandwiching the display portions 30A through 30C is turned off, the portions assuming the layered structure described above function as a refractive index diffraction grating. The procedure of the display method by using such a refractive index diffraction grating is explained with reference to a flowchart shown in FIG. 6. Illuminating light from the light source 10 having been converted to a linearly polarized light through the polarizing plate 12 to be detailed later enters the viewfinder display element 9 through its side surface (step S1).

The illuminating light thus entered is diffracted at the display portions 30A, 30B, and 30C upward in the figure (toward the pentaprism 7) and exits the viewfinder display element 9, as shown in FIG. 3A (step S2). As a result, the display pattern of the display portions 30A through 30C superimposed over the subject image can be observed by the user. When the voltage application to the transparent electrodes is turned on, the illuminating light is not diffracted over the areas assuming the layered structure and is instead transmitted, as shown in FIG. 3B. Thus, the illuminating light is not guided to the eyepiece lens 8 (see FIG. 1) and the user is able to observe the subject image alone.

As described above, a structure in which the refractive index at the liquid crystal and the refractive index at the polymer are different from each other and the light is diffracted when no voltage is applied but the liquid crystal orientation becomes altered to set the refractive index at the liquid crystal substantially equal to that of the polymer when the voltage is applied, is adopted in the embodiment. However, the details of the liquid crystal orientation are not limited to this example, and instead, a structure in which the refractive index at the liquid crystal and the refractive index at the polymer are substantially equal to each other when the voltage is not applied and light becomes diffracted due to a difference between the refractive index at the liquid crystal and the refractive index at the polymer caused by a change in the liquid crystal orientation when the voltage is applied, may be adopted.

In addition, while transparent electrodes assuming shapes substantially identical to each other are formed at the pair of glass substrates 20 and 21 in the embodiment described above, a transparent electrode may instead be formed at one of the glass substrates 20 and 21 and the other glass substrate may include a transparent electrode formed uniformly over the entire substrate surface thereof. A display can be brought up within the viewfinder field with diffracted light at a viewfinder display element assuming such a structure, much in the same way as at the viewfinder display element 9 explained earlier.

(Polarizing Plate 12)

Figure 4:
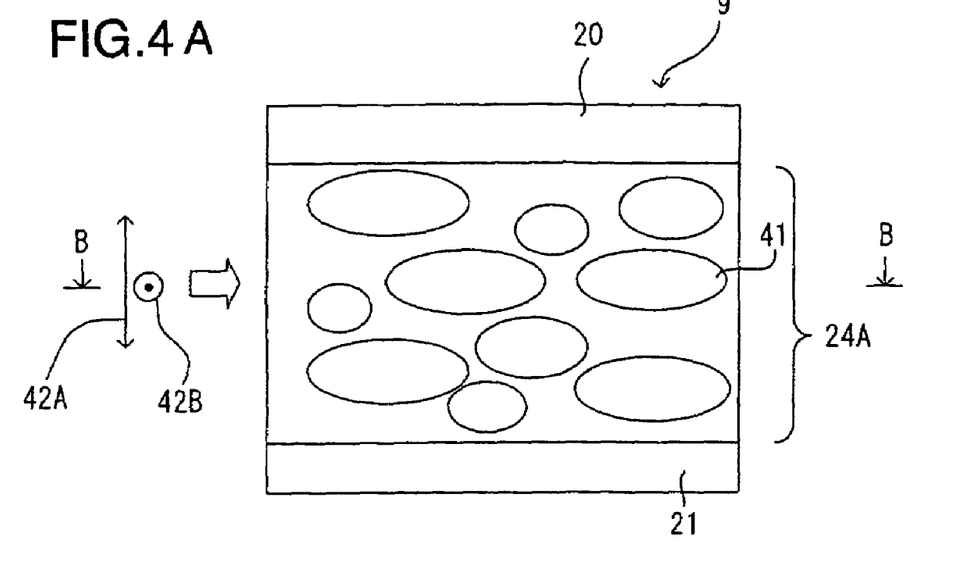
FIGS. 4A and 4B schematically illustrate part of the non-display portion of the viewfinder display element, respectively in a sectional view and in a sectional view taken along B-B in FIG. 4A.

Next, the functions of the polarizing plate 12 are explained in reference to FIGS. 4A and 4B. FIGS. 4A and 4B schematically show the liquid crystal conditions at the non-display portion 24A (see FIG. 2) at the viewfinder display element 9, respectively in a sectional view and in a sectional view taken along B-B in FIG. 4A. As explained earlier, over the non-display portion 24A, the refractive-index isotropic material (monomer) and the refractive-index anisotropic material (liquid crystal) are present in an unhardened, mixed state. Reference numeral 41 indicates a liquid crystal molecule. The illuminating light enters from the left side in the figures.

When viewed from a lateral direction, as in the sectional view presented in FIG. 4A, the liquid crystal molecules 41 in the liquid crystal sandwiched between the glass substrates 20 and 21 lie flat in layers. It is to be noted that since no orientation film is disposed at the viewfinder display element 9 in the embodiment, some of the liquid crystal molecules may not lie perfectly flat in layers and may instead be set at a slight tilt. However, they can be regarded to lie substantially flat in layers for practical purposes. The sectional view in FIG. 4B of the viewfinder display element 9 taken from above the substrate, on the other hand, shows that the liquid crystal molecules 41 are oriented randomly (the optical axes of the liquid crystal molecules are arranged randomly).

Let us now consider a situation in which linearly polarized light indicated by reference numeral 42A enters through a side surface of the viewfinder display element 9 with the liquid crystal molecules 41 oriented as shown in FIGS. 4A and 4B. Since the liquid crystal molecules 41 lie flat, the refractive index at the liquid crystal and the refractive index at the monomer assume equal values with regard to linearly polarized light perpendicular to the substrates as the linearly polarized light 42A. Thus, the linearly polarized light 42A is transmitted through the non-display portion 24A without becoming scattered. However, since the liquid crystal molecules 41 are oriented randomly with respect to linearly polarized light 42B parallel to the substrates, the refractive index at the liquid crystal and the refractive index at the monomer assume values different from each other for the linearly polarized light 42B, inducing scattering of the linearly polarized light 42B over the non-display portion 24A.

Accordingly, the polarizing plate 12 that allows polarized light perpendicular to the substrates to be transmitted is disposed between the light source 10 and the viewfinder display element 9 in the embodiment, as shown in FIGS. 1, 3A and 3B. Since the linearly polarized light 42A which is linearly polarized in a direction perpendicular to the substrates alone enters the viewfinder display element 9, the illuminating light is not scattered at the non-display portion 24A. As a result, the contrast between the display portions 30A through 30C and the non-display portion 24A around the display portions in FIG. 3A improves.

In addition, the linearly polarized light 42A advances parallel to the direction in which the optical axes of the liquid crystal molecules extend when the voltage is applied to the transparent electrodes 22 and 23 in FIG. 2 and thus, the diffraction efficiency of the diffracted light exiting the viewfinder display element 9 can be improved, which, in turn, further improves the contrast. It is to be noted that while the linearly polarized illuminating light component is generated by using the light source 10 and the polarizing plate 12 in combination in the embodiment described above, the present invention is not limited to this example and various other illuminating means may be utilized, as long as similar illuminating light is generated. For instance, instead of the absorptive polarizing plate 12, a selective polarization hologram may be used as the optical element that converts the illuminating light to the linearly polarized light 42A.

(Variation)

Figure 5:
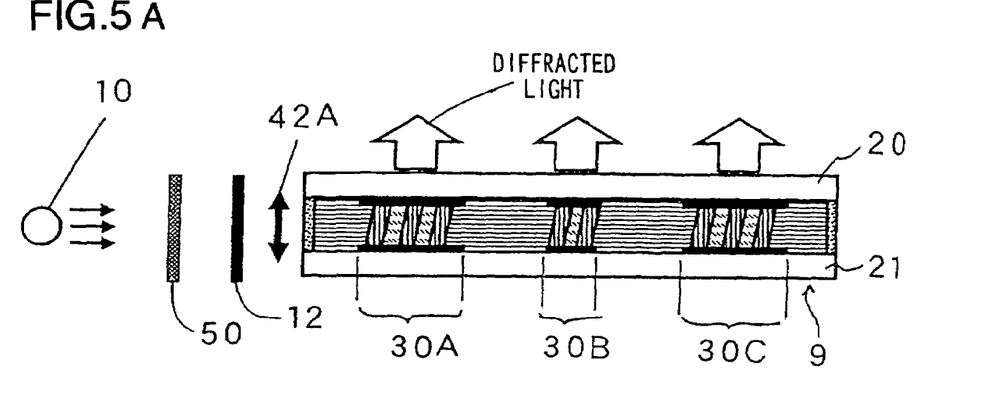
FIGS. 5A and 5B present an example of a variation of the embodiment with FIG. 5A showing a viewfinder display element in a sectional view and FIG. 5B showing the viewfinder display element in a plan view.

FIGS. 5A and 5B present an example of a variation of the embodiment with FIG. 5A showing a viewfinder display element 9 in a sectional view taken from a side thereof and FIG. 5B showing the viewfinder display element in a plan view. The variation includes a hologram diffusion element 50 disposed between the polarizing plate 12 and the light source 10. Light from the light source 10 constituted with an LED is radiated over an angle range of approximately ±30 to 40°. By adjusting the light beam angle to a greater value via the hologram diffusion element 50, the light having entered the viewfinder display element 9 undergoes total reflection at a side surface of the viewfinder display element 9. As shown in FIG. 5B, the side surface which assures total reflection is substantially perpendicular to the side surface of the viewfinder display element 9 to which illuminating light from the light source 10 enters.

As a result, the illuminating light can be uniformly distributed over the entire range of the viewfinder display element 9, which enables uniform display via the display portions 30A through 30C. It is to be noted that the optimal extent of diffusion (the extent of angle adjustment) via the hologram diffusion element 50 is achieved by taking into consideration the position at which the viewfinder display element 9 is disposed, the dimensions of the viewfinder display element 9, the total reflection angle and the like. In addition, an element other than a hologram diffusion element may be utilized as long as it is a radiation angle altering device capable of diffusing light by adjusting the illuminating light radiation angle.

While an explanation is given above on an example in which the diffraction display device according to the embodiment of the present invention is used as a viewfinder display element in a camera, the diffraction display device may be mounted at various types of optical apparatus other than a camera. In addition, while the display at the viewfinder display element 9 is turned on/off by turning on/off the voltage application to the transparent electrodes 22 and 23, the present invention may also be adopted in a diffraction display device that does not include a transparent electrode. Namely, in the viewfinder display element 9 in FIG. 2 minus the transparent electrodes 22 and 23, the state of the orientation of the liquid crystal molecules in the refractive-index anisotropic area layers 242 is identical to the orientation state observed when the voltage application to the transparent electrodes 22 and 23 is turned off. In other words, the diffraction function works at all times in such a display element. Thus, as long as the light source 10 is in an ON state, the display via the display portion 24B is on. In addition, the ON/OFF state at the display portion 24B can be controlled by turning on/off the light source 10.

By adopting the embodiments described above, the linearly polarized illuminating light enters the diffractive optical element through a side surface thereof, thereby reducing the extent of scattering of the illuminating light at the non-display portion and improving the contrast and the visibility.

The above described embodiments are examples, and various modifications can be made without departing from the scope of the invention.

What is claimed is:

1. A diffraction display device comprising:
a diffraction optical element that comprises a diffraction display portion and a non-display portion disposed between a pair of substrates, the pair of substrates facing each other in a first direction; and
an illuminating device that emits linearly polarized illuminating light to be incident on the diffraction optical element in a second direction that intersects with the first direction, wherein:
the illuminating light having entered the diffraction optical element exits the diffraction optical element through one of the pair of substrates in the first direction at which the diffraction display portion is disposed.

2. A diffraction display device according to claim 1, wherein:
the illuminating device comprises a light source and a polarization conversion element that converts the light emitted from the light source to light that is linearly polarized in a direction perpendicular to the substrates.

3. A diffraction display device according to claim 2, wherein: the polarization conversion element is a selective polarization hologram element.

4. A diffraction display device according to claim 2, further comprising:
a radiation angle altering device that is disposed between the light source and the polarization conversion element and alters a radiation angle of the illuminating light measured along a surface of the substrates.

5. A diffraction display device according to claim 4, wherein:
the radiation angle altering device alters the radiation angle so as to ensure that the illuminating light having entered the diffraction optical element undergoes total reflection at a side surface of the diffraction optical element that is substantially perpendicular to a side surface of the diffraction optical element to which the illuminating light enters in the second direction.

6. A diffraction display device according to claim 4, wherein: the light source is a LED.

7. A diffraction display device according to claim 1, wherein:
the diffraction display portion comprises refractive-index isotropic areas constituted with a refractive-index isotropic material and refractive-index anisotropic areas containing a refractive-index anisotropic liquid crystal disposed alternatively to each other in a direction extending along surfaces of the substrates; and
the non-display portion is disposed around the diffraction display portion, and is constituted with a mixed material containing both the liquid crystal and the refractive-index isotropic material.

8. A diffraction display device according to claim 7, wherein:
in the diffraction display portion, the refractive-index isotropic areas are constituted of a monomer that has hardened and become a polymer, and the liquid crystal is dispersed in a hardened polymer in the refractive-index anisotropic areas.

9. A viewfinder display device, comprising:
a diffraction display device according to claim 1, wherein:
the diffraction optical element is disposed in a vicinity of a focusing screen and viewfinder display is formed with the illuminating light diffracted at the diffraction display portion.

10. A camera, comprising:
a viewfinder display device according to claim 9, wherein:
the viewfinder display device superimposes a predefined information over a photographed subject image.

11. A display method by using a diffraction optical element that comprises a diffraction display portion and a non-display portion disposed between a pair of substrates, the pair of substrates facing each other in a first direction, comprising:
emitting linearly polarized illuminating light to be incident on the diffraction optical element in a second direction that intersects with the first direction, and
diffracting the illuminating light having entered the diffraction optical element so as the illuminating light to exit through one of the pair of the substrates in the first direction at which the diffraction display portion is disposed.

12. A diffraction display device according to claim 3, further comprising:
a radiation angle altering device that is disposed between the light source and the polarization conversion element and alters a radiation angle of the illuminating light measured along a surface of the substrates.

13. A diffraction display device according to claim 5, wherein:
the light source is a LED.

* * * * *